United States Patent
Albero et al.

(10) Patent No.: US 12,019,794 B1
(45) Date of Patent: Jun. 25, 2024

(54) INTERACTIVE EXTENDED REALITY PLATFORM SUPPORTING TARGETED DISPLAYS

(71) Applicant: Bank of America Corporation, Charlotte, NC (US)

(72) Inventors: George Albero, Charlotte, NC (US); Maharaj Mukherjee, Poughkeepsie, NY (US); Karen Davis, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/372,744

(22) Filed: Sep. 26, 2023

(51) Int. Cl.
*G06F 3/01* (2006.01)
*G06F 3/04815* (2022.01)

(52) U.S. Cl.
CPC .......... *G06F 3/012* (2013.01); *G06F 3/04815* (2013.01)

(58) Field of Classification Search
CPC .............................. G06F 3/012; G06F 3/04815
See application file for complete search history.

(56) References Cited

U.S. PATENT DOCUMENTS

| | | | | |
|---|---|---|---|---|
| 5,386,507 A * | 1/1995 | Teig | ........................ | G06T 17/00 |
| | | | | 715/848 |
| 10,290,147 B2 * | 5/2019 | Geselowitz | ............. | G06F 3/017 |
| 11,797,148 B1 * | 10/2023 | Richter | ................. | G06T 19/006 |
| 2023/0419618 A1 * | 12/2023 | Krenn | ................... | G06F 3/0483 |

* cited by examiner

*Primary Examiner* — Jonathan A Boyd
(74) *Attorney, Agent, or Firm* — Weiss & Arons LLP

(57) ABSTRACT

Methods and apparatus for alternating computing environments for viewing graphical displays is provided. The computing environments may include a 3D environment and a 2D environment. Methods may include monitoring a user interaction with an extended reality ("XR") headset. In parallel with the monitoring of the user interaction, methods may include running a machine learning ("ML") prediction algorithm to predict an opportunity to generate a graphical display, the graphical display may be a selectable icon. In response to a selection of the selectable icon, information may be displayed relating to the graphical display. In response to the ML prediction algorithm predicting the opportunity, methods and apparatus may include displaying the graphical display in the 3D environment. Methods and apparatus may further include executing a determination to determine which environment is an optimal environment for displaying the information and further toggling between the 3D and 2D environments based on the determination.

20 Claims, 6 Drawing Sheets

INTERACTIVE EXTENDED REALITY PLATFORM SUPPORTING TARGETED DISPLAYS

FIELD OF TECHNOLOGY

Aspects of the disclosure relate to extended reality ("XR") platforms.

BACKGROUND OF THE DISCLOSURE

An interactive 3-dimensional ("3D") experience is a 3D environment in which a user immerses. These 3D experiences may be tailored to provide the user with a maximum virtual experience.

Companies that support virtual reality ("VR") programs may desire to provide the user with advertisements or purchasing opportunities to increase host revenue and business opportunities.

However, it is not desirable to interrupt user experience to display an advertisement. When displaying an advertisement during an immersive 3D experience, the advertisement may distract the user.

Furthermore, 3D environments may not always be the ideal environment for providing the user with information associated with an advertisement.

Therefore, it would be desirable to provide an XR platform that provides advertisements to the user without distraction and in an optimal environment.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
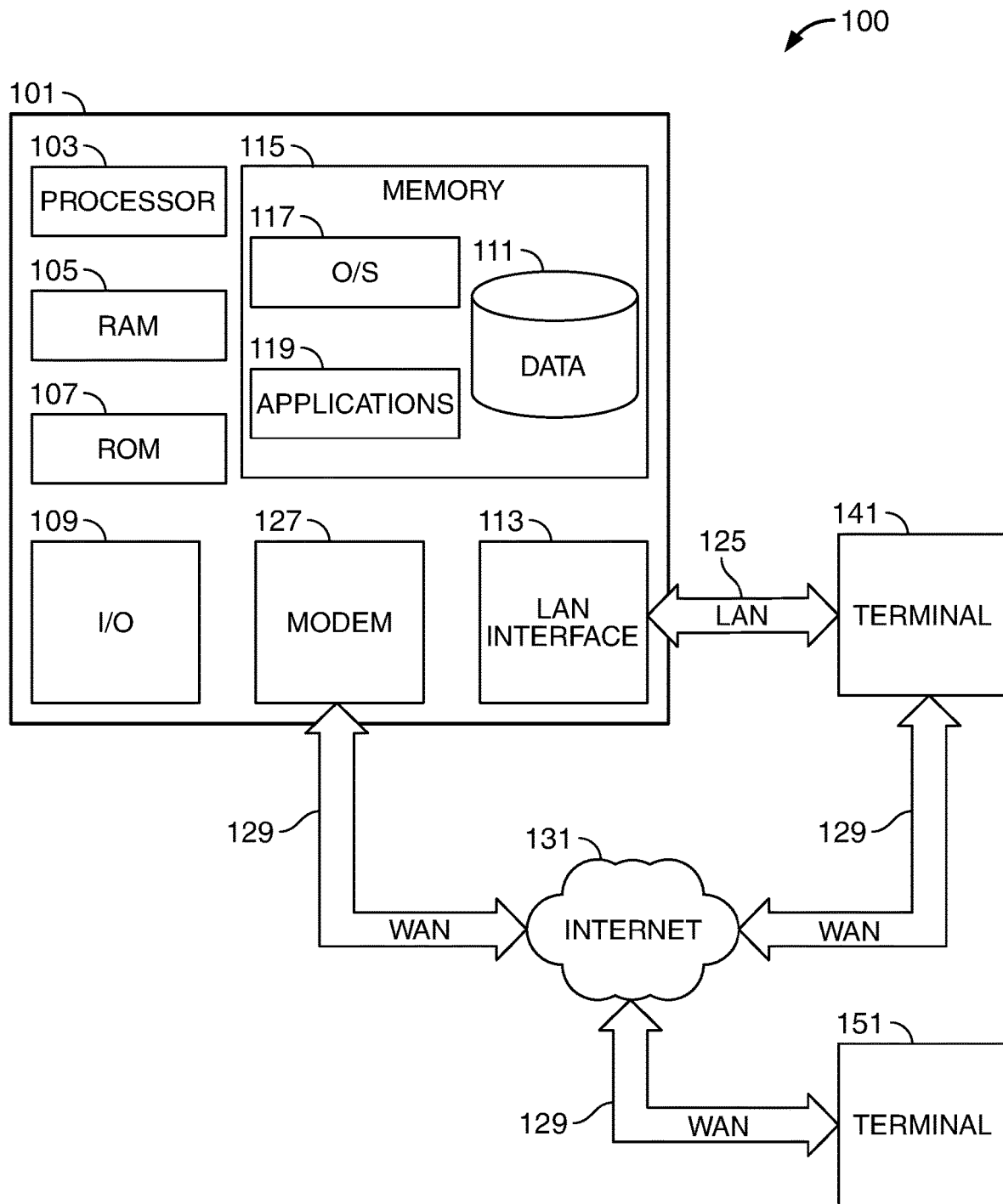
FIG. 1 shows an illustrative block diagram in accordance with principles of the disclosure.

Apparatus and methods for alternating computing environments for viewing graphical displays is provided. Computing environments may include different modes of displaying digital data from within an extended reality ("XR") device.

An XR environment may refer to the mode in which the digital data is displayed from within the XR device.

The XR device may include an augmented reality ("AR") device, a virtual reality ("VR") device and/or a device that can combine AR and VR environments. The XR device may include a unique device identification ("ID"). The XR device may include a sensor that can capture biometric information of a user. The XR device may include a computing device that may run an XR session. The computing device may be in electronic communication with the sensor.

The XR device may include smart glasses, virtual reality headsets, smartphones and/or wearable devices. The XR device may also include any suitable smart device that is integrated into a user's home, vehicle or clothing.

The computing environments may include a first extended reality ("XR") environment and a second XR environment. In some embodiments, the computing environments may include a third XR environment.

The first XR environment may be a 3-dimensional ("3D") environment. The first XR environment may be for displaying VR and AR movies, providing VR and AR interactive activities, interacting in the metaverse and any other suitable form of interaction that entails a 3D environment.

The second XR environment may be a 2-dimensional ("2D") environment. The 2D environment may be an environment enabled to display websites, documents, chatbots and any other suitable display.

In some embodiments, the XR device may include a virtual screen that may operate the same as a screen on a laptop or desktop computer. When the user is interacting with the XR device within the second XR environment, the user may be shopping, chatting, working and any other suitable interaction that may require a 2D environment.

The method may include monitoring a user interaction with the computing device. The user interaction may be any input received from the user in the XR environment. The user interaction may include a user interacting with the XR device via viewing a movie in the XR environment. The user interaction may include the user interacting with the XR device via a VR activity in the XR environment. The user interaction may include the user browsing, shopping and/or chatting on a website on the internet within the XR device.

The user interaction may be monitored to assist in determining the optimal environment for displaying information associated with graphical displays.

In parallel with the monitoring of the user interaction, the method may include running a machine learning ("ML") prediction algorithm to predict an opportunity to generate a graphical display.

The graphical display may be a selectable icon. In response to a selection of the selectable icon, information may be displayed relating to the graphical display.

The graphical display may be an advertisement. The advertisement may be a promotional advertisement. The advertisement may be generated using stored user information such as a user profile, selections typically executed by the user in the XR environment, and any other suitable user information. In some embodiments, when the XR platform is supported by a company, user information that is stored by the company may also be used to generate the advertisement. For example, if the company is a bank, customer information such as recent transaction history, purchases, etc. may be used to identify and generate the advertisement. Additionally, a third party may provide the XR platform with advertisements that the XR environment may then display when one or more predetermined conditions are met.

The ML prediction algorithm may access one or more databases that may store data associated with the user. The ML prediction algorithm may also leverage a database of promotional advertisements that may be waiting to be displayed. The ML prediction algorithm may be executed to determine an opportune instance to generate a displaying of the advertisement.

The method may include comparing the one or more keywords to activity metadata stored in an account profile of a user. When any one or more keywords correspond to activity metadata, the method may include predicting the opportunity for generating the graphical display that relates to the one or more keywords.

The ML prediction algorithm may crawl through the metadata tags linked to each advertisement and compare the metadata tags to data stored in the account profile.

When a promotional advertisement is determined to be associated with metadata tags associated with the user's account profile, the ML prediction algorithm may generate a display of the promotional advertisement.

The user may be a customer and/or employer of an entity. The entity may include an account profile for each user. The account profile may include data associated with activity the user performs within the entity. The account profile may be continuously updated based on transactions, purchases and any other type of activity performed within the entity.

For example, when the entity is a financial institution and the user takes out a loan to purchase a car, the loan associated with the car may be included in the account profile. When the ML prediction algorithm is running and determining whether there is an opportunity to generate a graphical display, the ML prediction algorithm may search the database of promotional advertisements for metadata tags associated with a home, car, loans and any other similar metadata.

Additionally, the account profile may include transaction history from most recent transactions, to past transactions. The ML prediction algorithm may leverage the transaction history to predict generating advertisements that may be associated with recent transactions performed by the user.

In some embodiments, the executing of the ML prediction algorithm may include retrieving one or more keywords associated with the user interaction. When any one or more keywords correspond to metadata tagged to one or more graphical displays, the method may include predicting the opportunity for generating the graphical display.

The executing of the ML prediction algorithm may include retrieving one or more keywords associated with the user interaction.

When the user interaction is associated with browsing, shopping and/or chatting, the keywords may be metadata tagged to the websites that the user is interacting with. The keywords may be words that are associated with the type of websites the user may be shopping on.

When the user interaction includes the user interacting virtually with the XR headset, or a movie, the keywords may be words that are associated with the type of movie or activity.

The prediction algorithm may be executed to find advertisements that may be within the same category or similar category to what the user is involved with in real-time.

The method may include, in response to the ML prediction algorithm predicting the opportunity, displaying the graphical display in the first XR environment.

The graphical display may be a small display associated with the advertisement. If the user has an interest in viewing additional information associated with the advertisement, the graphical display may be selected, and the user may be redirected to a second location on the internet to display additional information.

Prior to redirecting to a second location, the method may include executing a determination to determine if the first environment is an optimal environment for displaying information associated with the graphical display.

The determining of the optimal environment may be based on the type of graphical display being displayed.

When the graphical display is a 3D display, the optimal environment may be the first XR environment.

When the graphical display is a 2D advertisement, the optimal environment may be the second XR environment.

The method may further include, following the displaying of the information, monitoring the user's head movements while viewing the information, via the XR device.

The method may further include determining, using artificial intelligence ("AI"), whether the user is reacting to the computing environment in which the information is being displayed. The determining may be based on the whether the user's head movements are reactive over a pre-determined reaction threshold to the information being displayed.

The determining may include, when the user's head movements are greater than the pre-determined reaction threshold, maintaining the one of the computing environments. When the user's head movements are below the pre-determined reaction threshold, the method may include triggering a switching of the displaying to the other of the computing environments.

For example, when the information associated with the graphical display is displayed in the 3D environment and the user is not comfortable with viewing a 360 degree view of the advertisement, the user's head movements may be less than the pre-determined reaction threshold. This may be an indication that that this is not the optimal environment from the user's perspective. The user may prefer to view the advertisement in a 2D environment.

The method may include, in this example, triggering a switching of the XR environment from the 3D environment to the 2D environment.

Based on AI, the XR headset may be enabled to identify whether the user's head movements are below, within range or above the pre-determined reaction threshold.

A method for alternating computing environments for displaying graphical displays is provided. The method may include monitoring a user interaction with a computing device. The user interaction may be in an XR environment. The XR environment may include one of a first XR environment and a second XR environment.

In some embodiments, the method may include blending the displaying of the graphical display to match a computing environment, the computing environment being either the first XR environment or the second XR environment. Illustrative blending may include identifying an XR environment that the user is accessing and selecting an advertising medium from a group of predetermined mediums associated with the XR environment. In illustrative embodiments, the XR environment may be an ocean. Predetermined mediums may be a sea bird, boat, life jacket, jet ski, or any other suitable icons associated with the ocean XR environment.

In some embodiments, the optimal environment may be based on the uniform resource locator ("URL") embedded in the graphical display. The URL may be a location on the internet where upon selection of the graphical display may redirect the browser to additional information associated with the advertisement.

When the URL is an IP address, the optimal environment may be the 2D environment. When the URL is a site in a metaverse, the optimal environment may be the 3D environment.

The method may include, when the first XR environment is the optimal environment, maintaining the first XR environment for displaying the graphical display.

When the first XR environment is not the optimal environment, the method may include switching to a second XR environment. The second XR environment may be a 2D environment.

The switching may include toggling between the first XR environment and the second XR environment. The toggling may include, when the URL comprises the IP address, triggering a displaying of the graphical display in the second XR environment.

The toggling may further include, when the URL is a site in the metaverse, triggering a displaying of the graphical display in the first XR environment.

In some embodiments the URL may be a short URL that is redirectable. The short URL may be redirectable to a first location, a second location and a third location. The first location may be the IP address. The second location may be the address in the metaverse. The third location may be the XR address.

The toggling may be an automatic toggle performed by the XR device. In some embodiments, the toggling may be a manual toggle performed by the user at the XR device. The XR device may include a switch button where upon a tap or switch, the XR device may be operable to change the display environment from one environment to a second environment.

The XR headset may include a virtual screen for displaying 2D data. In this embodiment, the virtual screen may perform comparable to a display screen on a computing device, i.e.—smartphone, laptop.

When the computing device is the XR headset, the XR headset may provide alternative displays. The XR headset may provide a 2D view within the display screen on the XR headset. The 2D view may be a virtual screen displayed. The virtual screen may operate similar to a screen of a laptop, desktop, smartphone or other suitable device.

The XR headset may provide a 3D view within the display screen on the XR headset.

In some embodiments, the user may trigger the switch of the views. The headset may include a switch that alternates the view on the display screen.

In parallel with the monitoring of the user interaction, the method may include running an ML prediction algorithm to predict an opportunity to generate a graphical display.

The graphical display may be a selectable icon. A URL address may be linked to the graphical display. The URL may be a dynamic URL address.

In response to selection of the selectable icon, information may be displayed relating to the graphical display.

The method may include, in response to the ML prediction algorithm predicting the opportunity, executing a determination to determine which XR environment is an optimal environment for viewing information relating to the graphical display.

The executing of the ML prediction algorithm may include retrieving one or more keywords associated with the user interaction. The method may further include comparing the one or more keywords to activity metadata stored in an account profile of a user. When any one or more keywords correspond to activity metadata, the method may include predicting the opportunity for generating the graphical display that relates to the one or more keywords.

In some embodiments, the executing of the ML prediction algorithm may include retrieving one or more keywords associated with the user interaction. When any one or more keywords correspond to metadata tagged to one or more graphical displays, the method may include predicting the opportunity for generating the graphical display.

When the first XR environment is the optimal environment, the method may include embedding an XR web address to the graphical display.

When the first XR environment is not the optimal environment, the method may include embedding an IP address to the graphical display thereby switching to the second XR environment.

The method may include continuously monitoring the user interaction for a change in a type of the user interaction. The change in the type of the user interaction may trigger the dynamic URL address to alternate between the first XR environment and the second XR environment.

The method may include receiving a selection of the graphical display. In response to receiving the selection, the method may include displaying the graphical display based on the URL address.

It should be appreciated that the change in the type of the user interaction may result in a change in the type of XR environment.

In some embodiments the method may include a third XR environment. The third XR environment may include a view outside the computing device. The view outside the computing device may be a view on a flat screen of one of a smartphone, desktop computing device, Ipad or any other suitable computing device.

Upon selection of the graphical display, the information may be transmitted to a mobile device of the user for viewing. In some embodiments, the user may manually select an option for redirecting the display of the information to the user's mobile device.

In some embodiments an XR headset is provided. The XR headset may include a display screen configured for displaying data to a user on the XR headset.

The XR headset may also include a communication module. The communication module may be in electronic communication with an entity server for predicting opportunities to display graphical displays associated with third party vendors of the entity.

The XR headset may further include a monitoring application running on the XR headset. The monitoring application may be hosted by a remote entity server associated with the entity. The monitoring application may be configured to monitor a user interaction with the XR headset. The user interaction may be in a first XR environment. The first XR environment being the 3D environment.

The XR headset may also include a database. The database may be for storing a plurality of graphical displays and corresponding metadata associated with each of the plurality of graphical displays.

The database may also store an account profile for the user. The database may store an account profile for each user of the entity. The account profile may include user personal data, transaction history, account activity, recent purchases performed by the user and any other suitable data.

The XR headset may include a machine learning ("ML") prediction algorithm. The ML prediction algorithm may be executed by the XR headset. The ML prediction algorithm may be executed in parallel to the running of the monitoring application. The ML prediction algorithm may be configured to predict an opportunity to generate a graphical display. The graphical display may be from one of the plurality of graphical displays stored in the database.

The display screen may be configured to display the graphical display predicted to be displayed.

Following the displaying of the graphical display, the monitoring application may further be configured to determine an optimal environment for displaying the information relating to the graphical display. The information may be displayed following the user selecting the graphical display.

The determining may be based on the user interaction. The determining may be based on the URL embedded in the graphical display.

In some embodiments the determining of the optimal environment for displaying the information may be based on user behavior and the types of user interactions.

In some embodiments, the determining of the optimal environment for displaying the information may be based on the URL embedded in the graphical display. The URL may be associated with a VR environment. The URL may be associated with a 2D environment. The URL may be associated with a metaverse environment.

The determining may include executing a determination to determine if the first XR environment is an optimal XR environment for displaying information associated with the graphical display.

When the first XR environment is the optimal XR environment, the XR headset may be configured to maintain the first XR environment for displaying information associated with the graphical display. When the first XR environment is not the optimal XR environment, the XR headset may be configured to switch to a second XR environment.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The computing system may include one or more computer servers 101. Computer 101 may be any computing device described herein. Computer 101 may include any one or more XR devices. Computer 101 may include any one or more mobile devices of the user. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

When used in a LAN networking environment, computer 101 is connected to LAN 125 through a LAN interface 113 or an adapter. When used in a WAN networking environment, computer 101 may include an environment 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may include any one or more of the applications, instructions and algorithms associated with and/or embedded within the smart card, the POS device and any other applications described herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure. Applications 119 may include the developer application, the production application and any other application described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 2:
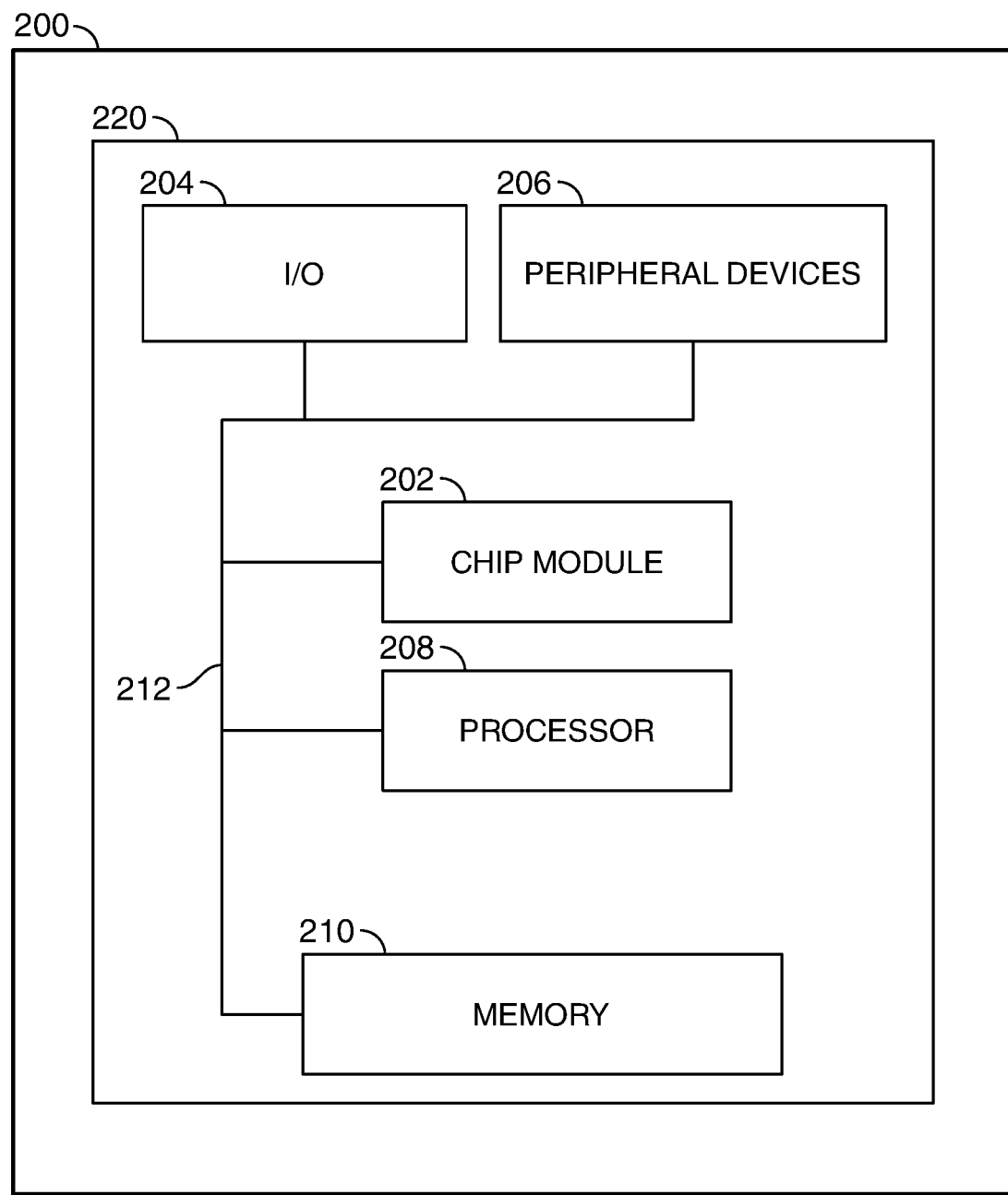
FIG. 2 shows an illustrative apparatus that may be configured in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data, and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
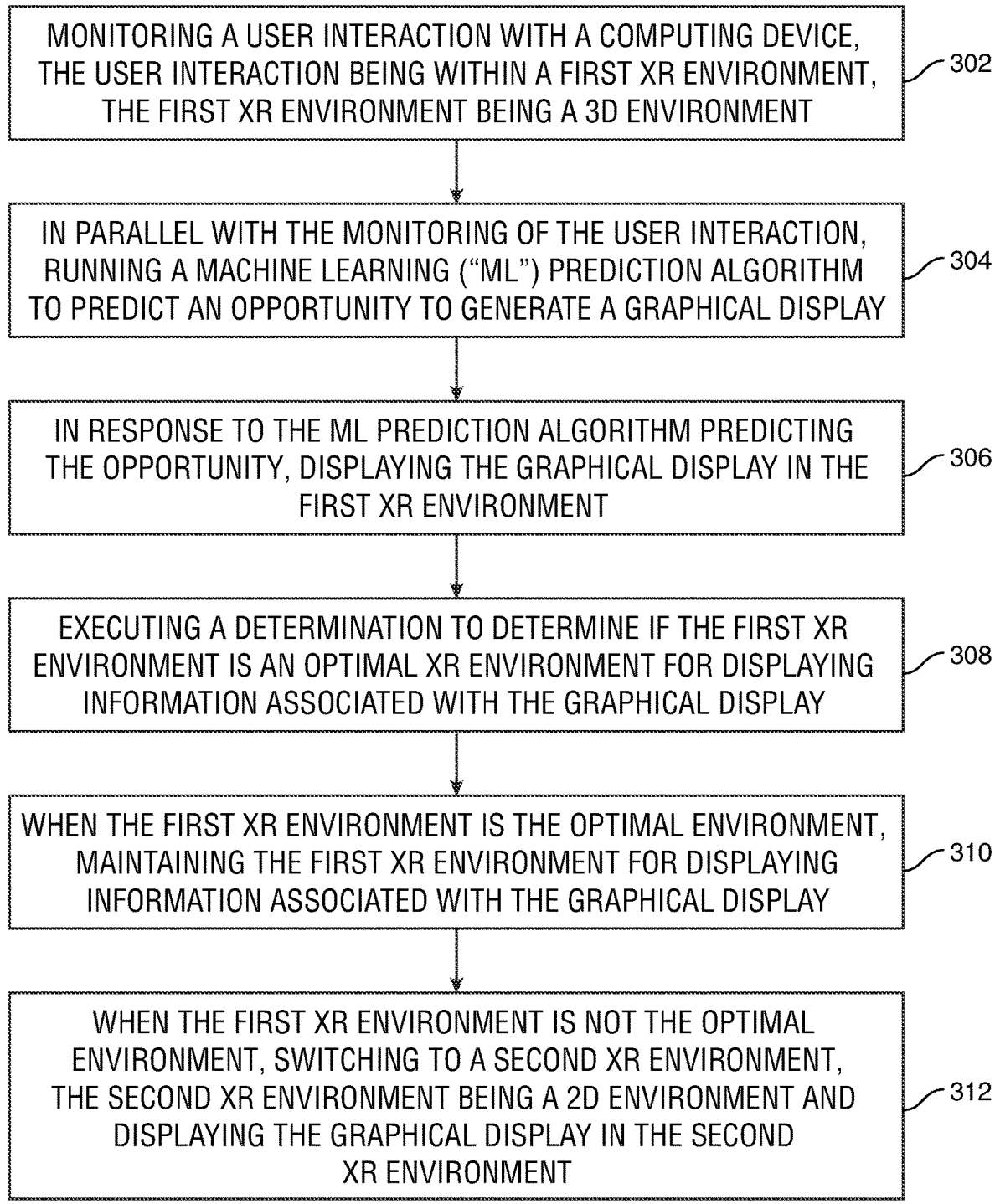
FIG. 3 shows an illustrative flow chart in accordance with principles of the disclosure.

FIG. 3 shows an illustrative flow chart for a method for triggering an optimal XR environment for displaying information associated with a graphical display.

At step 302, the method may include monitoring a user interaction with a computing device. The user interaction may be an interaction within a first XR environment. The first XR environment may be a 3D environment. In a 3D environment, the user interaction may include a user actively interacting with the XR device. The user interaction may include a VR movie being displayed to the user.

At step 304, the method may include, in parallel with the monitoring of the user interaction, running a ML prediction algorithm to predict an opportunity to generate a graphical display. The predicting may be based on historical transactions, actions, and views performed by the user and stored in an account profile of the user.

At step 306, the method may include, in response to the ML prediction algorithm predicting the opportunity, displaying the graphical display in the first XR environment. The graphical display may be a display where upon selecting the display, redirects to a second location. The second location may be a web address that may include additional information and detail associated with the graphical display.

At step 308 the method may include executing a determination to determine if the first XR environment is an optimal XR environment for displaying information associated with the graphical display.

At step 310, when the first XR environment is the optimal environment, the method step may include maintaining the first XR environment for displaying information associated with the graphical display.

At step 312, the method step may include, when the first XR environment is not the optimal environment, switching to a second XR environment. The second XR environment may be a 2D environment. The graphical display may then be displayed in the second XR environment.

Figure 4:
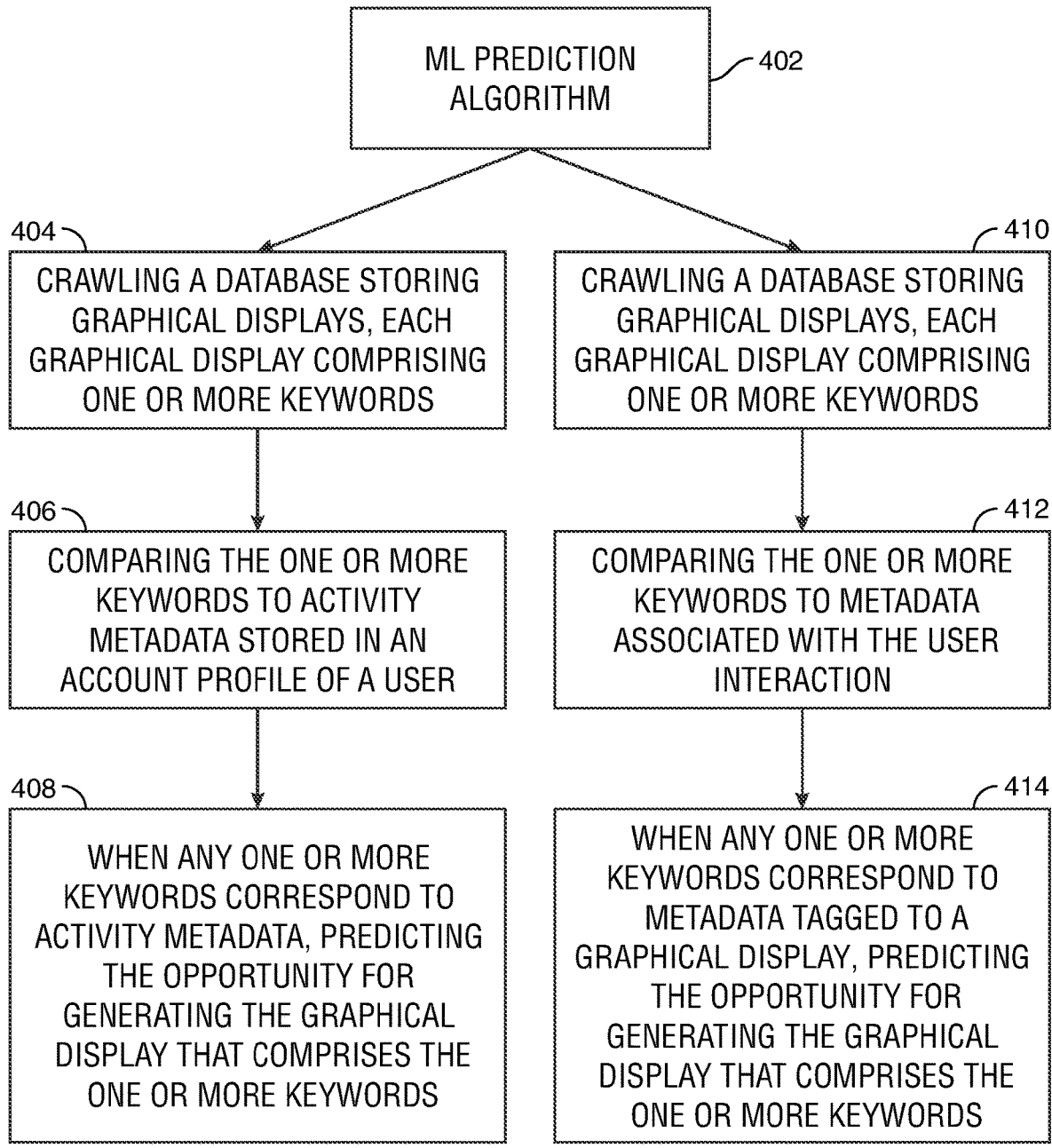
FIG. 4 shows an illustrative flow chart in accordance with principles of the disclosure.

FIG. 4 shows an illustrative flow chart for methods for predicting opportunities to display graphical displays. The predicting may be performed leveraging an ML prediction algorithm 402.

The ML prediction algorithm may be executed on the XR headset. The ML prediction algorithm, in some embodiments, may be stored and running on the XR headset. In some embodiments, the ML prediction algorithm may be stored in the entity server and upon execution, transmitted to the XR headset.

In some embodiments, the ML prediction algorithm may include the steps of 404, 406 and 408. In some embodiments, the ML prediction algorithm may include the steps of 410, 412, and 414.

In some embodiments, the method steps of 404, 406 and 408 may be performed. In some embodiments, the method steps of 410, 412 and 414 may be performed. In some embodiments, the ML prediction algorithm may perform both sets of steps simultaneously and/or subsequently.

Steps 404, 406 and 408 may be an algorithm based on the user's actions, transactions, and any other suitable performances that may be stored in the user's account profile.

At step 404, the method step may include crawling a database that stores graphical displays. The graphical display may be a list of advertisements that are pending an opportunity to be displayed to the user. Each advertisement may have one or more keywords linked to the advertisement.

At step 406, the method step may include comparing the one or more keywords to activity metadata stored in an account profile of the user. The activity metadata may be associated with transactions recently performed by the user. The activity metadata may include browser history of websites the user has browsed within a pre-determined range of time prior to the user interaction. The activity metadata may be associated with activities the user has performed within the entity.

At step 408, the method step may include when any one or more keywords correspond to activity metadata, predicting the opportunity for generating the graphical display that may include the one or more keywords.

Steps 410, 412 and 414 may be an algorithm based on the type of user interaction being performed. Based on the type of user interaction, graphical displays relating to the user interaction may be predicted to be displayed.

At step 410, the method step may include crawling the database that stores graphical displays where each graphical display may include one or more keywords tagged to the graphical display.

At step 412, the method step may include, comparing the one or more keywords to metadata associated with the user interaction. This may enable advertisements that may be associated with the type of user interaction being performed, to be displayed.

At step 414, when any one or more keywords correspond to metadata tagged to the graphical display, the method step may include predicting the opportunity for generating the graphical display that may include the one or more keywords.

It should be appreciated that more than one graphical display may include the same one or more keywords. When more than one graphical display does include identical keywords, the ML prediction algorithm may select one, two or more of the graphical displays that include identical keywords. In some embodiments, the graphical display retrieved may be based on a date that the graphical display was added to the database. The earlier the date, the higher the priority may be. In some embodiments, the later the data, the higher the priority may be.

Figure 5:
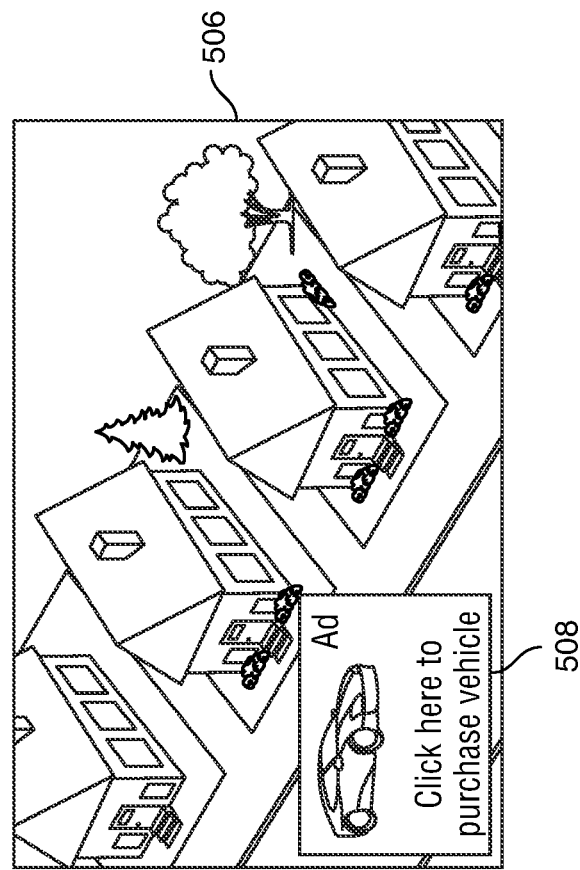
FIG. 5 shows an illustrative diagram in accordance with principles of the disclosure.
Figure 5:
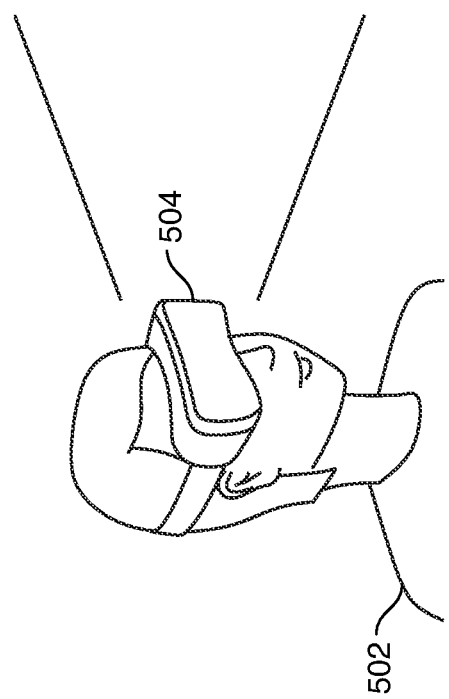

FIG. 5 shows an illustrative diagram of a user 502 interacting with XR headset 504 in a 3D environment. The 3D environment may be a VR environment, an AR environment or any other suitable 3D environment.

The user interaction may be an XR movie, an interactive activity, a metaverse session or any other suitable user interaction within a 3D environment.

During the user interaction between the user and the XR headset, a ML prediction algorithm may be running via a microprocessor embedded in the XR headset. The microprocessor may be monitoring the user interaction. Simultaneous to the monitoring, the ML prediction algorithm may be executed to determine whether there is a graphical display that may be enabled to be generated for display during the user interaction.

In this illustrative diagram, graphical display 508, may be determined to be displayed to the user in the XR environment 506. Graphical display 508 may be a promotional advertisement presented by a third party. The promotional advertisement may be for a latest car on sale. Graphical display 508 may be determined to be displayed based on recent purchases and/or activity performed by the user. Graphical display 508 may be determined to be displayed based on the type of user interaction.

Graphical display 508 may be a selectable icon. Upon selecting graphical display 508, additional information may be provided and displayed to the user on XR headset 504. The additional information may be displayed within XR environment 506. The additional information may be displayed in an alternative XR environment. The alternative environment may be a 2D environment.

Based on the monitoring of the user interaction, the XR environment may be switched from one environment to a second environment when displaying the additional information associated with the graphical display 508.

Figure 6:
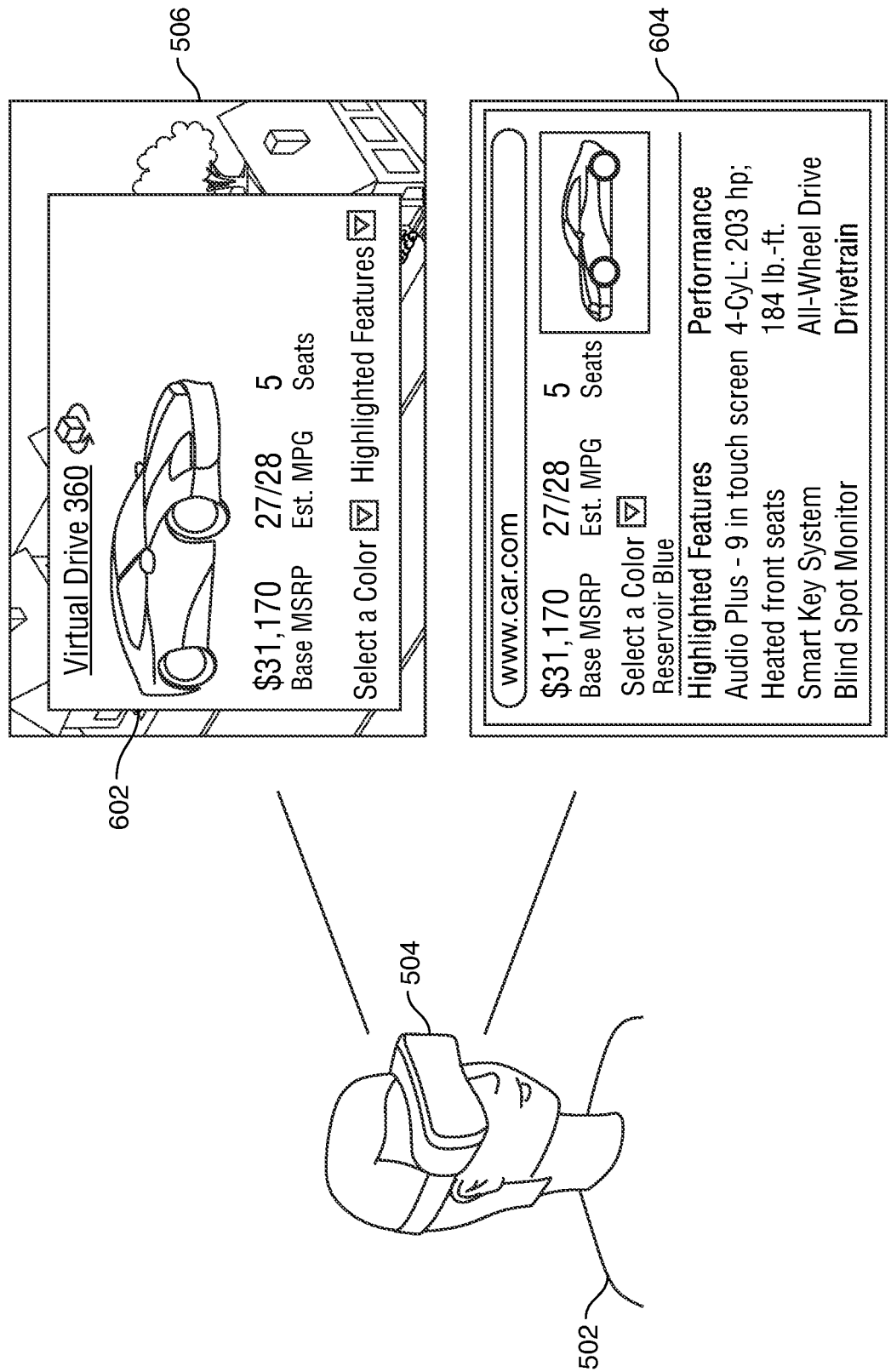
FIG. 6 shows an illustrative diagram in accordance with principles of the disclosure.

FIG. 6 shows an illustrative diagram of two types of XR environments that may be displayed within XR headset 504.

When the user selects the graphical display 508, shown in FIG. 5, the microprocessor may determine an optimal environment for the additional information to be displayed in.

When the optimal environment is the 3D environment, XR environment 506 may be maintained and the additional information 602 may be displayed within XR environment 506 as a 3D display.

When the optimal environment is a 2D environment, the method may include switching the environment to the 2D environment and displaying the additional information within the 2D environment, as shown in XR environment 604.

In this exemplary diagram, the graphical display is a promotional advertisement for a new car.

In XR environment 604, the additional information may be displayed in a web browser including a picture of the car and the information about the car.

In XR environment 506, the additional information may be displayed virtually as shown at 602. The additional information may be a 3D version of the car. The car may include additional features in the 3D environment, i.e.—a display of the inner parts of the car, a viewing of the car driving.

In some embodiments, the graphical display may include one URL that is static. The URL may be a URL that may display the additional information in 3D. The URL may be a web address configured to display the additional information in 2D. In this embodiment, the optimal environment may be one of the 3D or 2D environment.

In some embodiments, the graphical display may include a URL that may be dynamic. The URL may be a short URL that may be redirectable to both the 3D environment and the 2D environment. In this embodiment, the optimal environment may be based on the monitoring of the user interaction.

For example, when the user interaction is within the 3D environment and the user is viewing a movie, it may be appropriate to switch environments so the user is not distracted by the movie and will pause to view the advertisement.

When the user interaction is within the 3D environment and the user is interacting with the 3D screen, the user may be so immersed in the activity and pay no attention to the additional information even upon selecting the icon. In this example, the 3D environment may be the optimal environment to display the additional information so the user may take note of the advertisement even during the activity since it may blend into the scene of the activity when in 3D.

Thus, systems and methods for alternating computing environments for viewing graphical displays is provided. Persons skilled in the art will appreciate that the present invention can be practiced by other than the described embodiments, which are presented for purposes of illustration rather than of limitation.

What is claimed is:

1. A method for alternating computing environments for viewing graphical displays, the computing environments comprising a first extended reality ("XR") environment and a second XR environment, the method comprising:
   monitoring a user interaction with a computing device, the user interaction being in the first XR environment, the first XR environment being a 3-dimensional ("3D") environment, the user interaction being an interaction between a user of the computing device and the computing device;
   in parallel with the monitoring of the user interaction, running a machine learning ("ML") prediction algorithm to predict an opportunity to generate a graphical display, wherein:
      the graphical display is a selectable icon; and
      in response to a selection of the selectable icon, information is displayed relating to the graphical display;
   in response to the ML prediction algorithm predicting the opportunity, displaying the graphical display in the first XR environment;
   executing a determination to determine if the first XR environment is an optimal XR environment for displaying information associated with the graphical display;
   when the first XR environment is the optimal XR environment, maintaining the first XR environment for displaying information associated with the graphical display; and
   when the first XR environment is not the optimal XR environment:
      switching to a second XR environment, the second XR environment being a 2D environment; and
      displaying the graphical display in the second XR environment.

2. The method of claim 1 wherein the computing device is an XR device.

3. The method of claim 1 wherein the user interaction is one of a virtual reality ("VR") user interaction, augmented reality ("AR") interaction, viewing of entertainment and an interactive communication with a chatbot.

4. The method of claim 1 wherein the running of the ML prediction algorithm comprises:
   crawling a database storing graphical displays, each graphical display comprising one or more keywords;
   comparing the one or more keywords to activity metadata stored in an account profile of a user; and
   when any of the one or more keywords correspond to activity metadata, predicting the opportunity for generating the graphical display that comprises the one or more keywords.

5. The method of claim 1 wherein the running of the ML prediction algorithm comprises:
   crawling a database storing the graphical displays, each graphical display comprising one or more keywords;
   comparing the one or more keywords to metadata associated with the user interaction; and
   when any of the one or more keywords correspond to metadata associated with the user interaction, predicting the opportunity for generating the graphical display that comprises the one or more keywords.

6. The method of claim 1 wherein the graphical display comprises a uniform resource locator ("URL").

7. The method of claim 6 wherein based on the URL, the method comprises toggling between the first XR environment and the second XR environment.

8. The method of claim 7 wherein the toggling comprises:
   when the URL comprises an internet protocol ("IP") address, triggering a displaying of the graphical display in the second XR environment; and
   when the URL comprises a metaverse address, triggering a displaying of the graphical display in the first XR environment.

9. The method of claim 2 further comprising, following the displaying of the information:
   monitoring a user's head movements while viewing the information, via the XR device; and
   determining, using artificial intelligence ("AI"), whether the user is reacting to the computing environment in which the information is being displayed, the determining being based on whether the user's head movements are reactive over a pre-determined reaction threshold to the information being displayed, the determining comprising:
      when the user's head movements are greater than the pre-determined reaction threshold, maintaining the one of the computing environments; and
      when the user's head movements are below the pre-determined reaction threshold, triggering a switching of the displaying to the other of the computing environments.

10. The method of claim 6 wherein the URL is a short URL that is redirectable.

11. The method of claim 10 wherein the short URL is redirectable to a first location comprising an internet protocol ("IP") address, a second location comprising a metaverse address and a third location comprising an XR address.

12. The method of claim 1 further comprising blending the displaying of the graphical display to match a computing environment, the computing environment being either the first XR environment or the second XR environment.

13. A method for alternating computing environments for displaying graphical displays, the method comprising: monitoring a user interaction with a computing device, the user interaction being in an extended reality ("XR") environment, the XR environment comprising one of a first XR environment and a second XR environment; in parallel with the monitoring of the user interaction, running a machine learning ("ML") prediction algorithm to predict an opportunity to generate a graphical display, wherein: the graphical display is a selectable icon; a URL linking to the graphical display is a dynamic URL; and in response to selection of the selectable icon, information is displayed relating to the graphical display; in response to the ML prediction algorithm predicting the opportunity, executing a determination to determine which XR environment is an optimal environment for viewing information relating to the graphical display; when the URL is a site in a metaverse, the first XR environment is the optimal environment; when the URL comprises an IP address that is not in the metaverse, switching to the second XR environment; and continuously monitoring the user interaction for a change in a type of the user interaction, wherein the change in the type of the user interaction triggering the dynamic URL to alternate between the first XR environment and the second XR environment; receiving a selection of the graphical display; and in response to the selection, displaying the graphical display in one of the XR environments based on the URL address.

14. The method of claim 13 wherein the computing device is an XR device.

15. The method of claim 13 wherein the first XR environment is a 3 dimensional environment.

16. The method of claim 13 wherein the second XR environment is a 2 dimensional environment.

17. The method of claim 13 further comprising a third XR environment, the third XR environment being a view outside the computing device, the view outside the computing device being a view on a flat screen of one of a smartphone, desktop computing device and Ipad.

18. The method of claim 13 wherein the running of the ML prediction algorithm comprises: retrieving one or more keywords associated with the user interaction; comparing the one or more keywords to activity metadata stored in an account profile of a user; and when any of the one or more keywords correspond to activity metadata, predicting the opportunity for generating the graphical display that relates to the one or more keywords.

19. The method of claim 13 wherein the running of the ML prediction algorithm comprises: retrieving one or more keywords associated with the user interaction; and when any of the one or more keywords correspond to metadata tagged to one or more graphical displays, predicting the opportunity for generating the graphical display.

20. An extended reality ("XR") headset comprising: a display screen configured for displaying data to a user on the XR headset; a communication module in electronic communication with an entity server for predicting opportunities to display graphical displays associated with third party vendors of an entity; a monitoring application running on the XR headset, the monitoring application being hosted by a remote entity server associated with the entity, the monitoring application configured to monitor a user interaction with the XR headset, the user interaction being in a first XR environment, the first XR environment being a 3-dimensional ("3D") environment; a database configured to store: a plurality of graphical displays and corresponding metadata associated with each of the plurality of graphical displays; and an account profile for the user, the account profile being associated with the entity, the account profile comprising: transaction history, account activity and recent purchases performed by the user; a machine learning ("ML") prediction algorithm executed by the XR headset, the ML prediction algorithm running in parallel to the monitoring application, the ML prediction algorithm configured to predict an opportunity to generate a graphical display, the graphical display from one of the plurality of graphical displays, wherein: the graphical display is a selectable icon; and in response to a selection of the selectable icon, information is displayed relating to the graphical display; the display screen configured to display the graphical display predicted to be displayed; and the monitoring application further configured to determine an optimal environment for displaying the information relating to the graphical display, the determining comprising: executing a determination to determine if the first XR environment is an optimal XR environment for displaying information associated with the graphical display; when the first XR environment is the optimal XR environment, maintaining the first XR environment for displaying information associated with the graphical display; and when the first XR environment is not the optimal XR environment: switching to a second XR environment, the second XR environment being a 2D environment; and displaying the graphical display in the second XR environment.

* * * * *